Dec. 20, 1960

J. CHIMKO ET AL 2,965,189

VEHICLE SPEED GOVERNING DEVICE FOR USE
WITH AUTOMATIC TRANSMISSIONS

Filed Nov. 17, 1958

INVENTORS
John Chimko, &
Louis M. Fiteny
BY
R. L. Spencer
ATTORNEY

Dec. 20, 1960

J. CHIMKO ET AL 2,965,189

VEHICLE SPEED GOVERNING DEVICE FOR USE
WITH AUTOMATIC TRANSMISSIONS

Filed Nov. 17, 1958

INVENTORS
John Chimko, &
Louis M. Fiteny
BY R. L. Spencer
ATTORNEY

Dec. 20, 1960 J. CHIMKO ET AL 2,965,189
VEHICLE SPEED GOVERNING DEVICE FOR USE
WITH AUTOMATIC TRANSMISSIONS
Filed Nov. 17, 1958 5 Sheets-Sheet 4

INVENTORS
John Chimko, &
Louis M. Fiteny
BY R. L. Spencer
ATTORNEY

INVENTORS
John Chimko, &
Louis M. Fiteny
BY R. L. Spencer
ATTORNEY

United States Patent Office

2,965,189
Patented Dec. 20, 1960

2,965,189

VEHICLE SPEED GOVERNING DEVICE FOR USE WITH AUTOMATIC TRANSMISSIONS

John Chimko, Livonia, and Louis M. Fiteny, Allen Park, Mich., assignors to General Motors Corporation, Detroit, Mich., a corporation of Delaware Filed Nov. 17, 1958, Ser. No. 774,250

2 Claims. (Cl. 180—82.1)

This invention relates to a vehicle road speed governing device and more particularly to a throttle retarding mechanism effective upon attainment of a predetermined vehicle speed to close the engine throttle until the vehicle speed drops below the predetermined vehicle speed for which the governing mechanism is set. The invention is constructed and arranged particularly for use in connection with vehicles equipped with automatic transmissions of the type incorporating hydraulic governors and to use the governor delivered pressure as a signal pressure to render the throttle retarding device active and inactive. A fluid pressure responsive servo is normally connected to exhaust to permit normal uninhibited movement of the engine throttle through its control linkage. In the event of excessive vehicle speed, a valve controlled by governor pressure is positioned by the governor delivered pressure to direct fluid pressure to the servo to retard the throttle. The arrangement is such that the servo mechanism may be overcontrolled by the vehicle operator if he so desires.

An object of this invention is to provide a vehicle roadspeed governor device for limiting the vehicle speed to a maximum permissible speed constructed and arranged to permit normal free and uninhibited actuation of the vehicle fuel control system at vehicle speeds below the maximum permissible vehicle speed and automatically effective at vehicle speeds above the maximum permissible speed to condition the engine fuel supply system to deliver a minimum fuel charge to the engine.

Another object of this invention is to provide a vehicle roadspeed governing device incorporating a fluid pressure actuated servo member normally effective to permit free and uninhibited control of fuel supply to the engine and effective at vehicle speeds above a predetermined vehicle speed to position the fuel supply control means for engine idle condition of operation.

Another object of this invention is to provide a vehicle speed governing device incorporating a fluid pressure responsive servo member normally effective to permit normal control of fuel supply to the engine, wherein a valve is controlled by a vehicle speed responsive governor to deliver fluid pressure to a servo to retard the supply of fuel to the engine and wherein the vehicle operator may overcome the action of the servo simply by depressing the accelerator pedal.

A further object of this invention is to provide a vehicle speed governing device particularly adapted for use in connection with vehicles incorporating automatic transmissions and constructed and arranged to be installed in such vehicles with a minimum of change to the existing facilities and at a minimum of cost.

These and other objects of this invention will be apparent from the following description and drawings in which.

Figure 1:
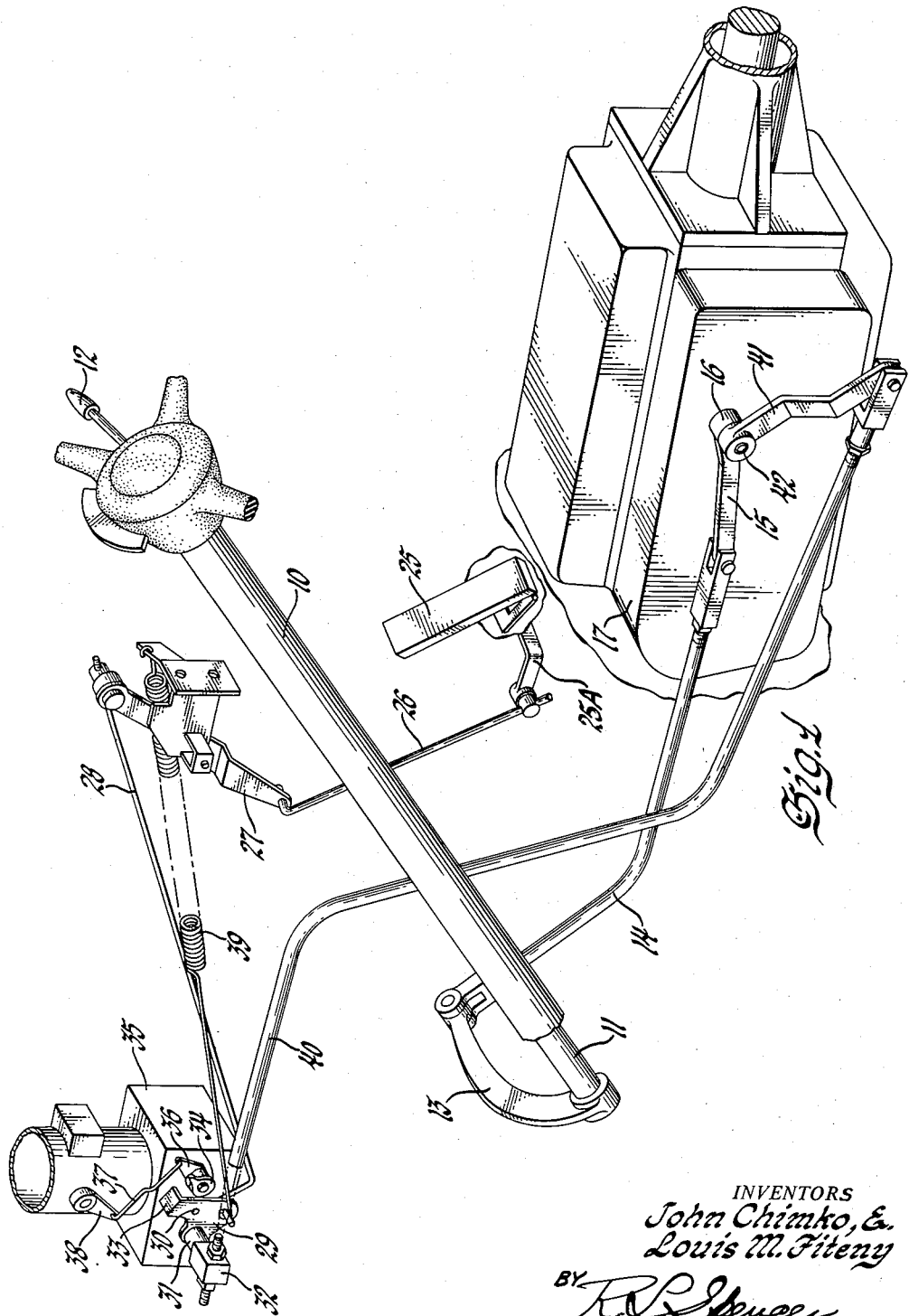
Figure 1 is a schematic diagram of the driver's control mechanism for controlling an engine throttle, and a pair of control shafts for controlling valves of an automatic transmission.

Referring to Figure 1, there is schematically shown a vehicle steering column 10 having a shaft 11 rotatably supported therein and extending therethrough, the shaft 11 being movable in steering column 10 by means of a control handle 12. Handle 12 is for the purpose of enabling the vehicle operator to select forward, neutral or reverse or low range or high range in an automatic transmission. A link 13 fixed for rotation with shaft 11 is connected to a link 15 by means of an intermediate link 14, the link 14 being connected to links 13 and 15 by means of pivotal joints at the opposite ends of link 14. Link 15 is integral with a hollow member 16. Rotation of lever 12 causes rotation of shaft 18, the shaft 18 being fixed to a hollow member 16 and has plate 19 fixed thereto for rotation therewith, see Figure 2. A pin 20 carried by plate 19 contacts a drive range selector valve 21 to move the valve 21 to various drive range positions. Thus rotation of handle 12 may move valve 21 to select various drive range conditions of operation such as, for example, low range forward, high range forward, neutral or reverse. Plate 19 is formed with a series of recesses or grooves 22 acting as cams in cooperation with a spring loaded plunger 23, see Figure 3, to yieldably hold valve 21 in any given selected position.

Referring further to Figure 1, an accelerator pedal 25, having an extension 25A integral therewith is connected to a rotatable plate 29 by means of links 26, 27 and 28, such that plate 29 may be rotated about a pivot pin 30 when the accelerator pedal is depressed. Rotation of plate 29 about pin 30 causes rotation of a stub shaft 31 and a connector block 32. Plate 29 carries a flange 33 adapted to contact a cam 34 fixed for rotation upon a carburetor body 35, the cam 34 being effective to rotate links 36, 37 and 38 upon depression of accelerator pedal 25. The link 38 is connected to a carburetor valve, not shown, so as to open the valve when the pedal 25 is depressed. The carburetor valve may be spring biased by a spring, not shown, towards its closed position. A spring 39, is effective to move plate 29 away from cam 34 to permit the engine throttle to close when the accelerator pedal 25 is retarded.

Figure 2:
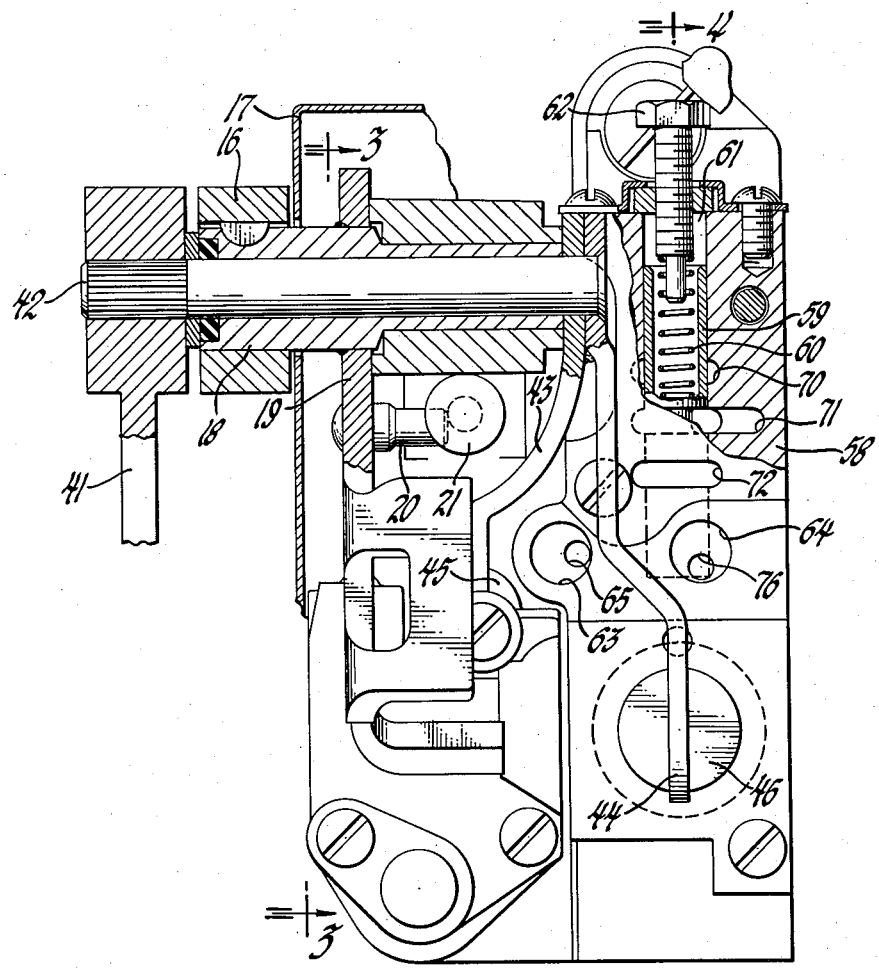
Figure 2 is an end view of the control valve assembly illustrating the linkage mechanism controlled by the control linkage of Figure 1.
Figure 3:
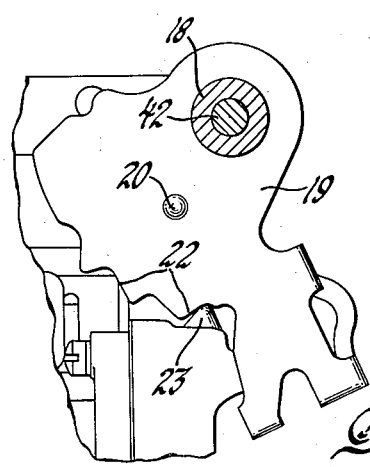
Figure 3 is a side view of a detent mechanism for retaining the shift lever of Figure 1 in any selected position and is taken along the line 3—3 of Figure 2.

Connector block 32 is connected to a solid shaft 42 extending through shaft 16 and bushing 18 of Figure 2 by means of links 40 and 41. Movement of accelerator pedal 25 causes rotation of shaft 42 of Figure 2. A pair of cams 43 and 44 are fixed to the inner end of shaft 42 for rotation with shaft 42. Cam 43 extends into contact with a conventional transmission variable pressure metering valve 45 adapted to deliver a variable hydraulic pressure which increases as the accelerator pedal 25 is depressed and decreases as the accelerator pedal is released. This valve 45, which is commonly used in automatic transmissions to supply variable control pressure for controlling the position of the transmission drive ratio shift valves is known as a throttle valve, but is not to be confused with the carburetor throttle valve. The cam or lever 44 extends downwardly into contact with a servo piston 46. Servo piston 46 is normally exhausted of fluid pressure and in normal operation does not interfere with the movement of the accelerator pedal towards a throttle opening position. However, in the event that the vehicle speed exceeds a predetermined vehicle speed, fluid pressure will be admitted to servo piston 46 to close the engine throttle until such time that the vehicle speed falls below the predetermined vehicle speed. In the event of an emergency at the time piston 46 has moved outwardly to close the engine throttle, the throttle may again be opened irrespective of the vehicle speed by conscious effort on the part of the vehicle operator by pushing down with extra force on the accelerator pedal.

Figure 4:
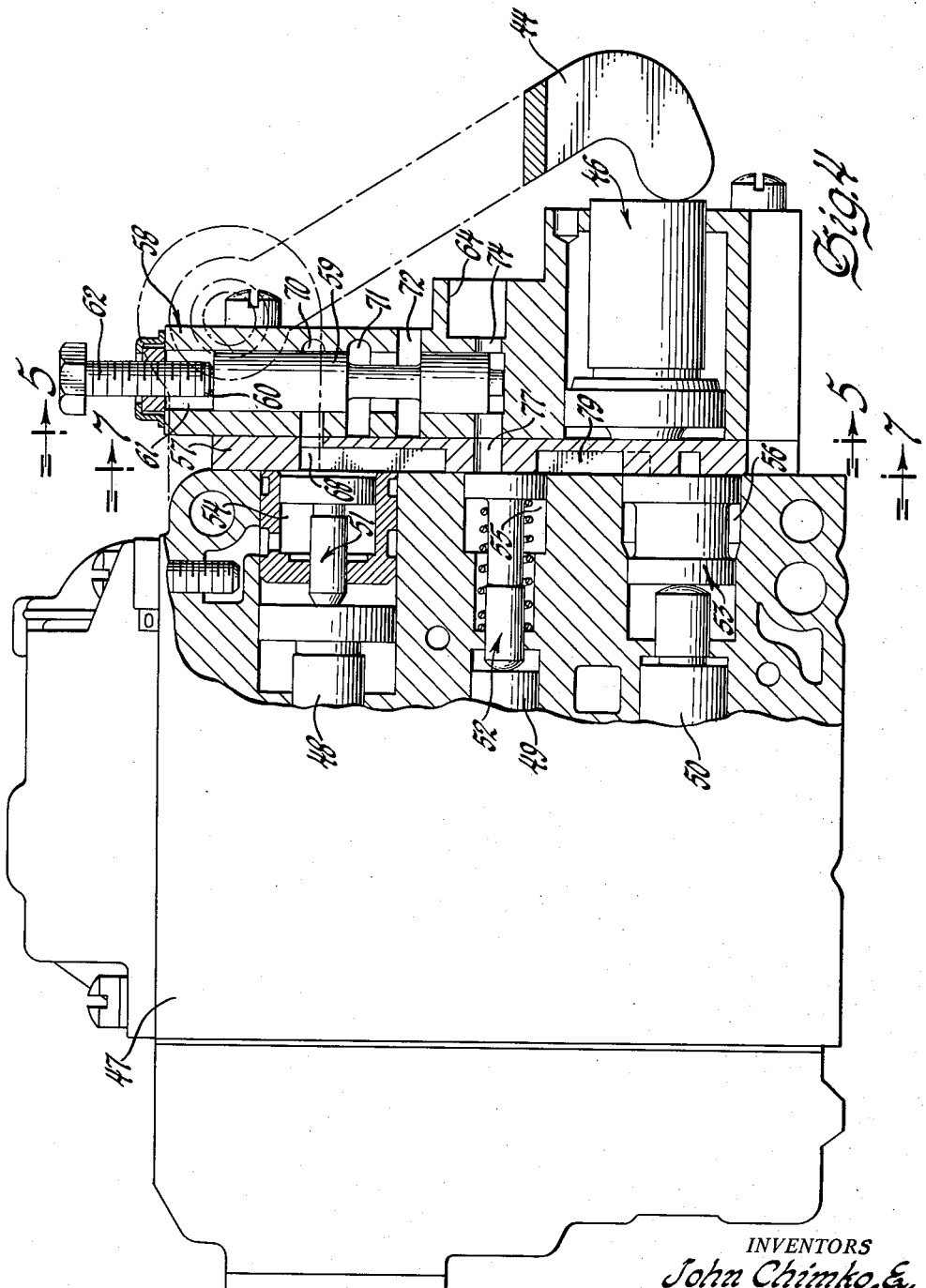
Figure 4 is a side view of the control valve body partially cut away to illustrate the transmission drive ratio shift valves, the governor controlled valve and the throttle retarding piston and is taken along the line 4—4 of Figure 2 with parts broken away and in section.

The arrangement of the present roadspeed limiting device is such that it may be mounted upon the valve body of existing automatic transmissions without disrupting the normal functioning of such transmissions. As shown in Figures 2 and 4, the roadspeed governing device is mounted upon the rear of the transmission shift valve body. As shown particularly in Figure 4, a shift valve body 47 contains hydraulically controlled shift valves 48, 49 and 50 for controlling the transmission drive ratio. Governor plugs 51, 52 and 53 are associated with the valves 48, 49 and 50, respectively. Chambers 54, 55 and 56, associated with governor plugs 51, 52 and 53, respectively, are adapted to receive governor delivered pressure tending to upshift the valves to change the transmission drive ratio. Hydraulic governors adapted to deliver a variable pressure which increases with increase in vehicle speed are well known in the art, and accordingly are not shown in this application. Secured to the end of valve body 47 is a roadspeed governor body 58, there being a spacer plate 57 between valve body 47 and governor body 58. Roadspeed governor body 58 carries roadspeed governor piston 46 and roadspeed governor valve 59. As shown in Figure 2, roadspeed governor valve 59 is spring biased by a spring 60 to its innermost position in a bore 61 in valve body 58. The tension in spring 60 may be varied by means of an adjusting screw 62 to vary the vehicle speed at which the roadspeed governor valve becomes effective to admit pressure to piston 46 to retard the engine throttle. At vehicle speeds below a predetermined vehicle speed, spring 60 positions valve 59 to connect servo piston 46 to exhaust. At speeds above a predetermined vehicle speed, valve 59 moves against spring 60 to admit pressure to servo piston 46. Piston 46 thereupon, acting through lever 44, shaft 42, link 41 and link 40 becomes effective to permit the throttle to close.

As shown in Figure 2, governor body 58 is provided with two openings 63 and 64 adapted to receive fluid pressure from a vehicle speed responsive governor, not shown. One such governor which may be employed is shown and fully described in the patent to Earl A. Thompson 2,204,- 872 issued June 18, 1940. Such a governor is adapted to be driven by the transmission output shaft and to deliver two variable governor pressures each of which increase with increase in vehicle speed, but at different rates. The two governor pressures are termed G-1 and G-2, with the G-1 pressure increasing at a faster rate than G-2 pressure. Opening 63 is adapted to receive G-1 pressure and opening 64 is adapted to receive G-2 pressure through governor pressure delivery pipes, not shown. It is contemplated that the G-1 delivery pipe 139' and the G-2 delivery pipe 138' of Thompson 2,204,872 would be connected to openings 63 and 64, respectively, of the present disclosure. Roadspeed governor body 58 and spacer plate 57 cooperate to deliver both G-1 and G-2 pressure to the shift valve governor plugs such that control of the transmission drive ratio is not disturbed over the conventional arrangement wherein no roadspeed governor is employed. Thus, the present roadspeed governor may be attached to a conventional transmission simply and economically without modifying the transmission conventional drive ratio controls.

*G-1 pressure*

Figure 5:
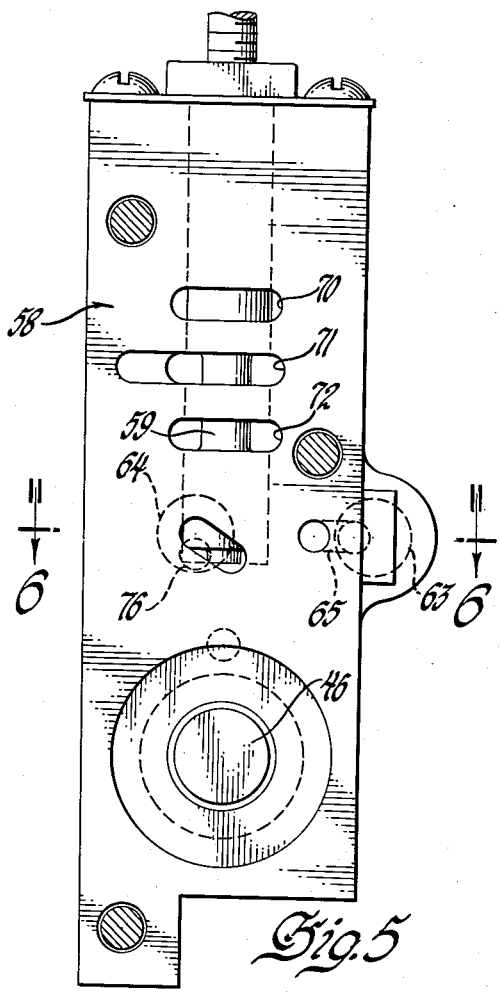
Figure 5 is a side view of the roadspeed governor body taken along the line 5—5 of Figure 4.
Figure 7:
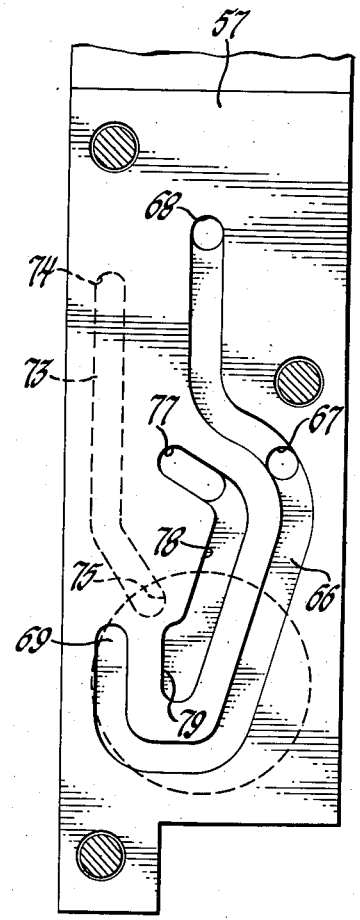
Figure 7 is a side view of the spacer plate adapted to be positioned between the governor body and shift valve body taken along the line 7—7 of Figure 4.
Figure 6:
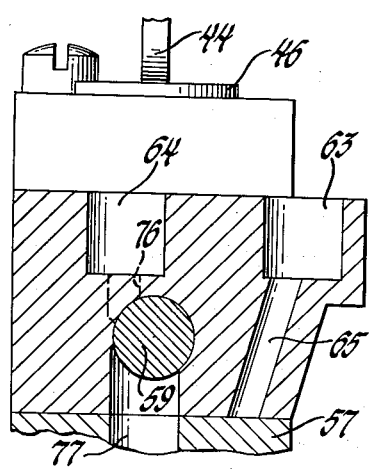
Figure 6 is a sectional view of the governor body taken along the line 6—6 of Figure 5.

As shown in Figures 5 and 6, a passage 65 in roadspeed governor body 58 connects opening 63 to spacer plate 57. As shown in Figure 7, spacer plate 57 is provided with an oil distribution channel 66 having a pair of ports 67 and 68. Port 67 extends entirely through plate 57 and communicates with passage 65 of roadspeed governor body 58 to admit G-1 governor pressure to channel 66. Ports 67 and 68 are drilled entirely through spacer plate 57 in order to admit G-1 governor pressure to the shift valves for normal control of the shift valves in the conventional manner. A port 69 in channel 66 also conducts G-1 governor pressure to the transmission shift valves for normal control of the shift valves. Port 68 of channel 66 extends through plate 57 to admit G-1 governor pressure to a port 70 of roadspeed governor body 58. Spacer plate 57 is provided with a second oil distribution channel 73 having ports 74 and 75. Port 74 of spacer plate 57 communicates with a port 71 of the roadspeed governor body. Port 72 of governor body 58 is an exhaust port. Port 75 of channel 73 communicates with servo piston 46. Valve 59 is normally spring biased to block off port 70 and to connect port 71 to exhaust port 72. Channel 73 is therefore normally connected to exhaust so that no pressure is acting upon servo piston 46. It will be noted that G-1 governor pressure is continuously supplied to the shift valves for control purposes irrespective of the position of the roadspeed governor valve 59 in roadspeed governor body 58. The G-1 pressure admitted to the shift valves for controlling the shift valves will vary between a very low value when the vehicle is stopped to substantially line pressure at relatively high vehicle speeds as is conventional in existing automatic transmission control systems. Valve 59, however, will not open until a sufficiently high vehicle speed is attained such that the G-1 governor pressure is substantially equal to line pressure.

*G-2 Governor pressure*

As heretofore stated, the present roadspeed governor device is arranged for use in automatic transmissions of the type incorporating a vehicle speed responsive governor constructed and arranged to deliver two governor pressures for controlling the transmission shift valves. These two pressures vary with changes in vehicle speed but at different rates. G-1 pressure rises to full line pressure at a faster rate than does the G-2 pressure. The G-2 pressure is used herein to control the roadspeed governor valve 59 as well as the position of the shift valves. G-2 oil is admitted to the roadspeed governor body 58 through opening 64, which opening 64 is connected to valve bore 61 through a passage 76. G-2 pressure in valve bore 61 at the end of roadspeed governor valve 59 tends to move valve 59 against spring 60. At relatively low vehicle speed, valve 59 will not be moved sufficiently to connect port 70 to port 71. G-2 pressure will, however, be admitted to the shift valves for control purposes through a port 77 in spacer plate 57, a channel 78 in plate 57, and a port 79 in plate 57. Port 77 extends entirely through spacer plate 57 to admit G-2 pressure to the shift valves as well as to channel 78.

This G-2 governor pressure is applied continuously to the shift valves for control purposes and also is applied continuously to roadspeed governor valve 59, tending to move the valve 59 against spring 60 to connect port 70 to port 71. At speeds below a predetermined vehicle speed, valve 59 is effective to connect servo piston 46 to exhaust by way of channel 73 and ports 71 and 72. At speeds above a predetermined vehicle speed, G-2 governor pressure acting upon the end of valve 59 moves the valve 59 against spring 60 to block off exhaust port 72 and to connect port 70 to port 71. In this condition of operation, G-1 governor pressure is admitted to servo piston 46 by way of ports 70 and 71 and channel 73. At this time, G-1 pressure acting against piston 46 will be substantially equal to line pressure, due to the relatively high vehicle speed. Piston 46 is forced outwardly from roadspeed governor body 58 to move the linkage 44, 41 and 40 to a position wherein cam 33 is moved away from cam 34 to permit the throttle closing spring, not shown, to close the carburetor throttle. The vehicle speed at which G-2 pressure becomes effective to move valve 59 to admit G-1 pressure to servo piston 46 may be varied by adjusting the adjustment screw 62 to vary the load on spring 60. When G-1 governor pressure is admitted to servo 46 to close the engine carburetor throttle valve, the valve 59 will remain in its position wherein G-1 pressure is delivered to servo 46 until such time that the vehicle speed drops sufficiently that a corresponding drop in G-2 governor pressure permits spring 60 to again position valve 59 to connect the servo piston 46 to exhaust. Upon such a drop in vehicle speed to the predetermined vehicle speed at which valve 59 is caused to deliver pressure to servo 46, the servo will be connected to exhaust.

It will be noted that at vehicle speeds below the maximum speed setting, the servo piston has no effect upon the carburetor throttle linkage. At vehicle speeds above the predetermined vehice speed, servo piston 46 is effective to close the engine throttle valve. However, emergencies may arise wherein fluid pressure acting on servo piston 46 may cause the servo to close the engine throttle and it may be necessary to obtain full engine power irrespective of the action of the roadspeed governor device. For example, in passing another vehicle, the driver may wish to continue the application of full engine power even though the roadspeed governor may be calling for a closed throttle. This may be done by a conscious effort on the part of the vehicle operator by applying a greater than normal force to the accelerator pedal 25. The force applied to the linkage through the accelerator pedal and tending to open the engine throttle is sufficient to overcome the force applied to the linkage by servo piston 46 so that the operator may overrule the roadspeed governor even though the governor is tending to close the engine throttle.

Assuming that the vehicle speed remains above the maximum speed for which the roadspeed governor is set, the roadspeed governor will be effective to again close the engine throttle when the operator relaxes the pressure applied to the accelerator to a normal pressure. It is only by applying an abnormal pressure to the accelerator pedal that the operator is able to overrule the roadspeed governor. It will be observed that the roadspeed governor device is simple in construction and is adapted particularly for quick and easy assembly upon a standard transmission control valve body without disturbing the normal functioning of the control valves.

Figure 8:
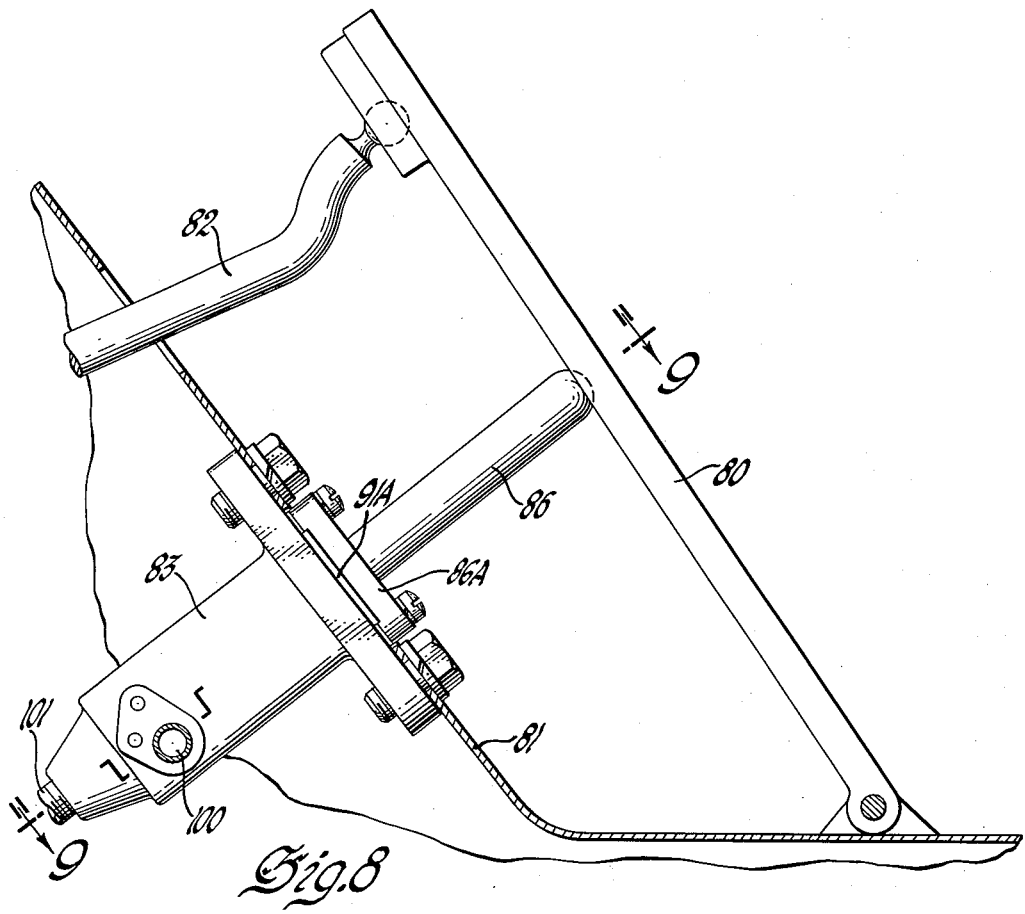
Figure 8 is a schematic view of an alternate roadspeed governor device adapted to be mounted on the vehicle floor board.
Figure 9:
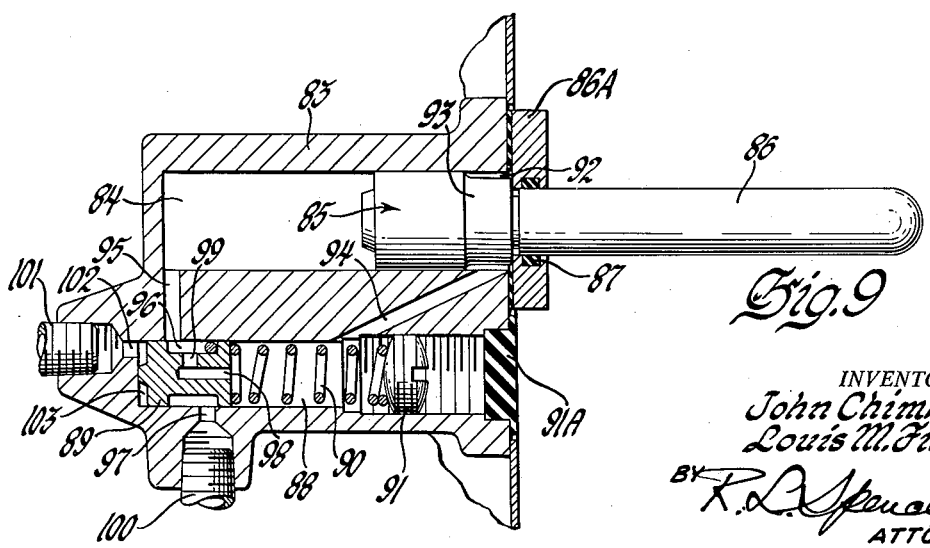
Figure 9 is a sectional view of the roadspeed governor device of Figure 8 taken along the line 9—9 of Figure 8.

In Figures 8 and 9 there is shown a roadspeed governor device constructed and arranged to be assembled upon the vehicle floor board and to act directly upon the vehicle accelerator pedal.

As shown in Figure 8, a vehicle accelerator pedal 80 is pivotally mounted upon a vehicle floor board 81 to control the position of the vehicle carburetor throttle, not shown, through a conventional linkage including link 82. Also mounted upon floor board 81 is a servo 83 having a bore 84 therein. A piston 85 is disposed in bore 84, the piston 85 being provided with an extension 86 extending upwardly from floor board 81 and adapted to contact accelerator pedal 80. A removable cover 86A having an oil seal 87 permits the piston to be assembled in bore 84 and prevents leakage of oil from the end of the bore.

A second bore 88 in servo housing 83 contains a control valve 89 yieldably biased by a spring 90 to the position shown in Figure 9. Spring 90 seats upon an adjustable screw 91 threaded into bore 88. Screw 91 may be adjusted in bore 88 to vary the tension on spring 90. A cover 91A closes off the end of the bore adjacent adjusting screw 91. A chamber 92 between a recessed portion 93 and cover 86A is continuously connected to bore 88 by means of a passage 94. A passage 95 extends between bore 84 and bore 88. An annular groove 96 in valve 89 connects passage 95 to an exhaust port 97 when the valve 89 is positioned as shown.

An axial passage 98 and a port 99 in valve 89 connect bore 88 to recess 96 and exhaust port 97 when the valve 89 is positioned as shown. A pipe 100 is connected to exhaust port 97 to return oil to the transmission sump, not shown. A governor oil delivery pipe 101 is connected to housing 83 to deliver governor pressure to a chamber 103 adjacent valve 89 through a port 102. Governor delivered oil, which increases with increase in vehicle speed and acting in chamber 103 biases valve 89 against spring 90. It is contemplated that the G-2 governor pressure delivery pipe 138' of Thompson 2,204,-872 will be connected to pipe 101 of the present disclosure to deliver G-1 governor pressure to port 102. At speed below a predetermined permissible vehicle speed, spring 90 will retain valve 89 in a position wherein bore 84 is connected to exhaust. It will also be noted that both chamber 92 and bore 88 are likewise connected to exhaust through passage 98, port 99 and recess 96. In this manner any hydraulic block which might otherwise occur due to oil leakage past piston 85 or valve 89 is prevented. At some predetermined vehicle speed, governor pressure acting in chamber 103 will become effective to move valve 89 against spring 90 a sufficient distance to connect port 102 to passage 95. When the valve 89 is moved to this position, the valve blocks off passage 95 from exhaust port 97. Pressure in bore 84 is thereupon effective to move piston 85 to force accelerator pedal upwardly to close the carburetor throttle valve. The accelerator pedal will normally be retained in a relaxed position until the vehicle speed drops below the maximum permissible vehicle speed, whereupon it may again be depressed with a normal foot pressure to again advance the throttle. However, in case of an emergency, the vehicle operator may depress the accelerator pedal to open the engine throttle by applying an abnormal force to the accelerator pedal even though the servo piston 85 is applying force tending to retard the accelerator pedal. At speeds below the predetermined vehicle speed, action of the accelerator pedal is normal and piston 85 presents no obstruction to movement of the accelerator pedal. At speeds above the predetermined maximum permissible speed, piston 85 will move the accelerator pedal to retard the throttle if normal foot pressure is applied to the accelerator pedal. However, the roadspeed governor device may be overruled by the operator simply by applying an abnormal force to the accelerator pedal. This safety feature in the design permits the operator to simply and quickly overcome the roadspeed governor.

We claim:

1. In combination in an engine driven vehicle of the type having an automatic transmission and having a shift valve body enclosing valving for controlling the transmission drive ratio, a fuel control system including a driver operable accelerator pedal movable upon application of normal pressure thereto from an initial position wherein said fuel system is effective to deliver a minimum fuel charge to said engine to an advanced position wherein said fuel system is effective to deliver a maximum charge of fuel to said engine, a roadspeed governor device for limiting the maximum permissible vehicle roadspeed, said roadspeed governor device including a roadspeed governor body mounted upon said valve body, a hydraulic vehicle speed responsive governor adapted to deliver a variable hydraulic pressure which increases with increase in vehicle speed hydraulically connected to said roadspeed governor body, passages in said roadspeed governor body continuously connecting said shift valve body to said hydraulic governor, first and second bores in said roadspeed governor body, a control valve in said first bore for controlling the admission of pressure to and exhaust of pressure from said second bore, said first bore being hydraulically connected to said speed responsive governor, spring means yieldably biasing said control valve to connect said second bore to exhaust, a piston in said second bore, means operatively connecting said piston to said accelerator pedal, said valve being responsive to pressure delivered to said first bore to deliver fluid pressure to said second bore when said vehicle speed exceeds said maximum permissible vehicle speed, said piston being effective to position said accelerator pedal in said initial position in response to fluid pressure in said second bore when normal pressure is applied to said accelerator pedal by said vehicle driver, said accelerator pedal being movable to said advanced position irrespective of the action of said fluid pressure in said second bore upon application of abnormal pressure to said accelerator pedal by said vehicle driver.

2. In combination in an engine driven vehicle of the type having an automatic transmission having a shift valve body enclosing a shift valve for controlling the transmission drive ratio, a fuel control system including a driver operable fuel control mechanism movable upon application of normal pressure thereto from an initial position wherein said fuel system is effective to deliver a minimum fuel charge to said engine to an advanced position wherein said fuel system is effective to deliver a maximum fuel charge to said engine, a roadspeed governor device for limiting the maximum permissible vehicle roadspeed, said roadspeed governor device including a roadspeed governor body detachably secured to said shift valve body, a hydraulic vehicle speed responsive governor of the type adapted to deliver a variable hydraulic pressure which varies with changes in vehicle speed having its output pressure connected to said roadspeed governor body, passage means in said roadspeed governor body continuously connecting said hydraulic governor to said shift valve body to admit fluid pressure to said shift valve to control the position of said shift valve, a first bore in said roadspeed governor body, a second bore in said governor body, a control valve disposed in said first bore for controlling the admission of governor delivered pressure to and exhaust of pressure from said second bore, said first bore being hydraulically connected to said speed responsive governor, spring means normally effective to position said control valve to connect said second bore to exhaust, a piston in said second bore, means operatively connecting said piston to said driver operable fuel control mechanism including a shaft rotatably supported in said shift valve body and having a lever fixed thereto and extending into the path of travel of said piston, said control valve being movable in response to pressure delivered to said first bore to deliver governor pressure to said second bore when said vehicle speed exceeds said maximum permissible vehicle speed, said piston being movable in response to fluid pressure to position said lever and said fuel control mechanism to deliver a minimum fuel charge to said engine, said fuel control mechanism being movable to said advanced position irrespective of the action of said piston upon application of abnormal force to said fuel control mechanism by said vehicle driver.

References Cited in the file of this patent

UNITED STATES PATENTS

| 2,111,284 | Girl et al. | Mar. 15, 1938 |
| 2,324,191 | Bowers | July 13, 1943 |
| 2,337,910 | Maybach | Dec. 28, 1943 |
| 2,527,352 | Christian | Oct. 24, 1950 |
| 2,714,880 | Riley | Aug. 9, 1955 |
| 2,800,036 | Miller | July 23, 1957 |
| 2,815,684 | Roche | Dec. 10, 1957 |
| 2,887,198 | Hobbs | May 19, 1959 |